(12) United States Patent
Yin et al.

(10) Patent No.: US 9,960,466 B2
(45) Date of Patent: May 1, 2018

(54) RECHARGEABLE BATTERY

(71) Applicants: Tsinghua University, Beijing (CN);
HON HAI PRECISION INDUSTRY CO., LTD., New Taipei (TW)

(72) Inventors: Yan-Li Yin, Beijing (CN);
Chang-Hong Liu, Beijing (CN);
Shou-Shan Fan, Beijing (CN)

(73) Assignees: Tsinghua University, Beijing (CN);
HON HAI PRECISION INDUSTRY CO., LTD., New Taipei (TW)

( * ) Notice: Subject to any disclaimer, the term of this patent is extended or adjusted under 35 U.S.C. 154(b) by 83 days.

(21) Appl. No.: 14/884,779

(22) Filed: Oct. 16, 2015

(65) Prior Publication Data

US 2016/0111763 A1  Apr. 21, 2016

(30) Foreign Application Priority Data

Oct. 17, 2014  (CN) .......................... 2014 1 0550802

(51) Int. Cl.

| H01M 12/00 | (2006.01) |
| H01M 4/50 | (2010.01) |
| H01M 2/30 | (2006.01) |
| H01M 4/02 | (2006.01) |

(52) U.S. Cl.
CPC .......... *H01M 12/005* (2013.01); *H01M 2/30* (2013.01); *H01M 4/02* (2013.01); *H01M 4/50* (2013.01)

(58) Field of Classification Search
None
See application file for complete search history.

(56) References Cited

U.S. PATENT DOCUMENTS

| 5,591,546 A * | 1/1997 | Nagaura ............. H01M 2/0272 429/156 |
| 2003/0215720 A1* | 11/2003 | Shembel ............... H01M 6/168 429/326 |
| 2010/0178543 A1* | 7/2010 | Gruner ................... B82Y 30/00 429/121 |
| 2010/0203362 A1* | 8/2010 | Lam ........................ H01M 4/56 429/7 |

FOREIGN PATENT DOCUMENTS

| CN | 101641809 A | 2/2010 |
| CN | 103165918 A | 6/2013 |

* cited by examiner

*Primary Examiner* — Wojciech Haske
(74) *Attorney, Agent, or Firm* — ScienBiziP, P.C.

(57) ABSTRACT

The invention relates to a rechargeable battery includes a first electrode, a second electrode, a separator, and electrolyte. The first electrode includes a first supercapacitor electrode, a first battery electrode, a first current collector, and a first connector. The first battery electrode is sandwiched between the first supercapacitor electrode and the first current collector. The first supercapacitor electrode and the first current collector are electrically connected via the first connector.

17 Claims, 10 Drawing Sheets

RECHARGEABLE BATTERY

CROSS-REFERENCE TO RELATED APPLICATIONS

This application claims all benefits accruing under 35 U.S.C. § 119 from China Patent Application No. 201410550802.X, filed on Oct. 17, 2014, in the China Intellectual Property Office.

FIELD

The present application relates to rechargeable batteries.

BACKGROUND

As common electrical energy storage devices, batteries can be classified into primary batteries and secondary batteries. The primary batteries are used once and discarded. Common examples are zinc-manganese dioxide battery, and lithium battery. The secondary batteries (rechargeable batteries) can be discharged and recharged multiple times. Examples include the lead-acid battery, nickel-metal hydride battery, and lithium-ion battery. Trails on making the primary battery, especially the zinc-manganese dioxide battery, to be rechargeable have been widely investigated. U.S. application Ser. No. 14/451,828 disclosed a hybrid energy storage device combining a supercapacitor with a battery in series. This hybrid energy storage device has a small volume and a lower cost of manufacture, but could not be recharged when it is exhausted.

What is needed, therefore, is to provide a rechargeable battery that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

Figure 1:
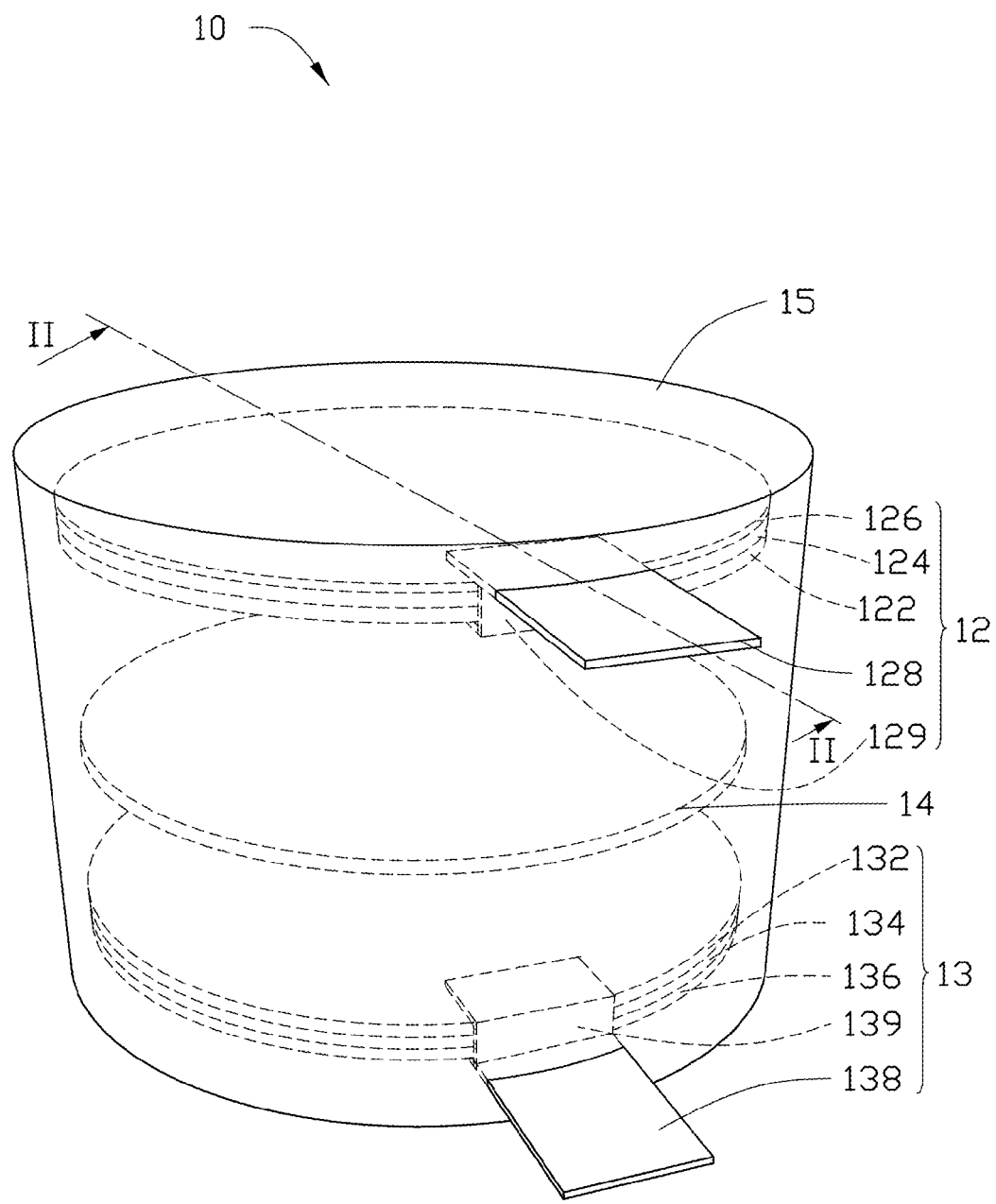
FIG. 1 is a structural schematic view of one embodiment of a rechargeable battery.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

References will now be made to the drawings to describe, in detail, various embodiments of the present epitaxial structures and methods for making the same.

Figure 2:
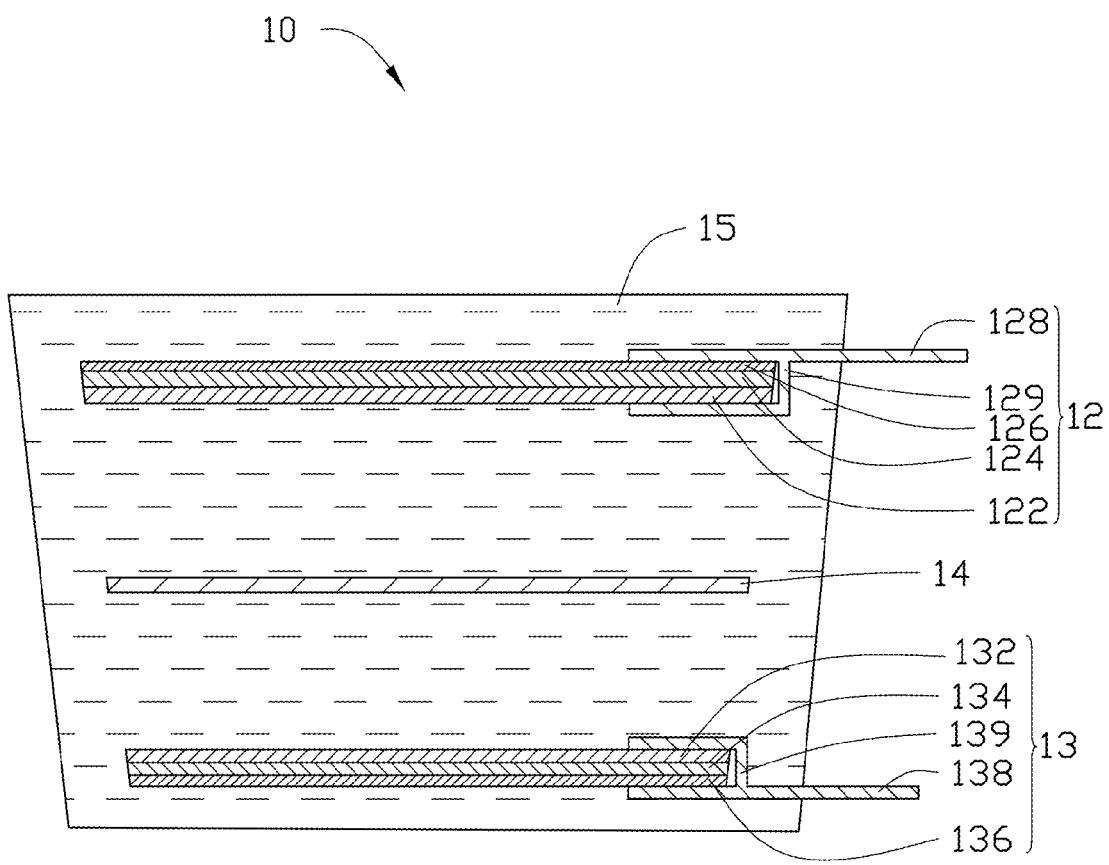
FIG. 2 is a cross-sectional view of one embodiment of the rechargeable battery of FIG. 1 along line II-II.

Referring to FIG. 1 and FIG. 2, a rechargeable battery 10 of one embodiment includes a first electrode 12, a second electrode 13, a separator 14, and electrolyte 15. The first electrode 12, the second electrode 13, and the separator 14 are planar structures. The separator 14 is sandwiched between the first electrode 12 and the second electrode 13.

The first electrode 12 includes a first supercapacitor electrode 122, a first battery electrode 124, a first current collector 126, and a first connector 129. The first supercapacitor electrode 122, the first battery electrode 124, and the first current collector 126 are planar structures and the first battery electrode 124 is sandwiched between the first supercapacitor electrode 122 and the first current collector 126. The first supercapacitor electrode 122 is adjacent to the separator 14. The first supercapacitor electrode 122 comprises a first surface and a second surface opposite to the first surface. Both the first surface and the second surface are parallel with the first battery electrode 124. The second surface is adjacent to, parallel with, and in direct contact with the first battery electrode 124. The first current collector 126 comprises a third surface and a fourth surface opposite to the third surface. Both the third surface and the fourth surface are parallel with the first battery electrode 124. The third surface is adjacent to, parallel with, and in direct contact with the first battery electrode 124. The fourth surface is in direct contact with the electrolyte 15. The first supercapacitor electrode 122 and the first current collector 126 are electrically connected via the first connector 129.

The first connector 129 is in direct contact with at least one part of the first surface. The first connector 129 is also in direct contact with at least one part of the fourth surface. The first connector 129 is a substantially n-shaped connector, and comprises a first portion, a second portion, and a third portion connected in series. The first portion is in direct contact with at least one part of the first surface, the third portion is in direct contact with at least one part of the fourth surface. At least one part of the first supercapacitor electrode 122 is sandwiched between the first battery electrode 124 and the first connector 128.

Figure 3:
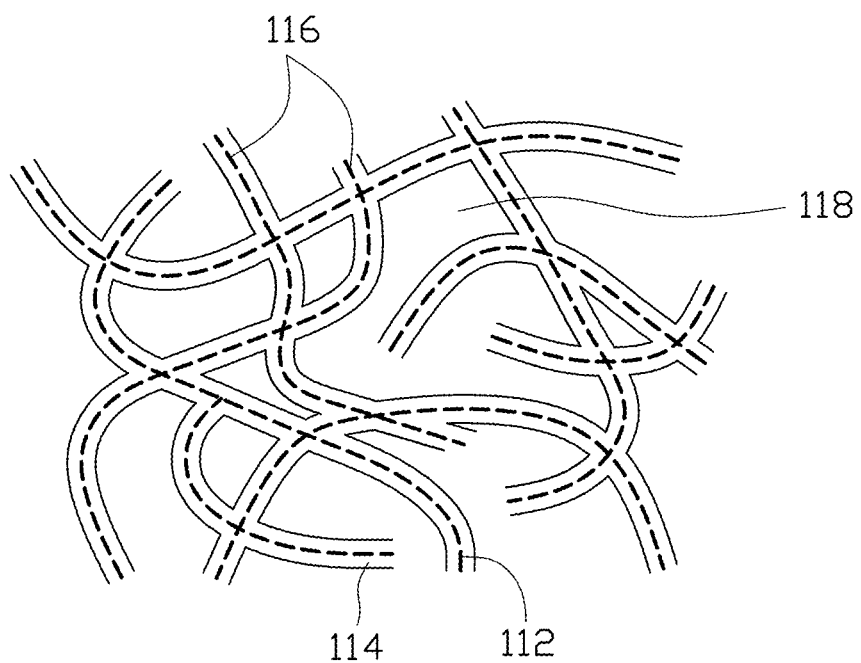
FIG. 3 is a schematic view of an embodiment of a CNT/PANI composite film of one embodiment of the rechargeable battery.

The first supercapacitor electrode 122 comprises a carbon nanotube/polyaniline (CNT/PANI) composite film 110, as shown in FIG. 3. The CNT/PANI composite film 110 includes a carbon nanotube network structure 116 and a polyaniline layer 114, wherein the polyaniline layer 114 includes a conductive polymer. In one embodiment, the carbon nanotube network structure 116 is a carbon nanotube paper.

The carbon nanotube network structure 116 includes a plurality of carbon nanotubes 112 combined by van der Waals attractive force therebetween and forming a free-standing film network. The term "free-standing" includes, but is not limited to, a structure that does not have to be supported by a substrate and can sustain its own weight when it is hoisted by a portion of the structure without any significant damage to its structural integrity. The free-standing property is achieved only due to the van der Waals attractive force between adjacent carbon nanotubes 112. The carbon nanotube network structure 116 includes a plurality of micropores 118 formed by adjacent carbon nanotubes 112. A size of the plurality of micropores 118 can be in a range from about 60 nanometers to about 400 nanometers.

The polyaniline layer 114 is coated on a surface of the carbon nanotube network structure 116. The polyaniline layer 114 wraps around the plurality of carbon nanotubes 112 to form a tubular coating planar structure. The carbon nanotube network structure 116 serves as the core and the template to support the polyaniline layer 114. In one embodiment, the polyaniline layer 114 is coated on the entire surface of the carbon nanotube network structure 116, such that the surface of each carbon nanotube 112 is coated by the polyaniline layer 114. The first supercapacitor electrode 122 and the second supercapacitor electrode 132 have thinness, light-weight, flexibility and enhanced electrochemical properties, because the first supercapacitor electrode 122 and the second supercapacitor electrode 132 include the plurality of carbon nanotubes 112 and micropores 118.

The plurality of carbon nanotubes 112 can be orderly or disorderly arranged. The term 'disordered CNT structure' includes, but is not limited to, a structure in which the plurality of carbon nanotubes 112 is arranged along many different directions so that the number of carbon nanotubes 112 arranged along each different direction can be almost the same (e.g. uniformly disordered) and/or entangled with each other. The term 'Ordered CNT structure' includes, but is not limited to, a structure in which the plurality of carbon nanotubes 112 is arranged in a consistently systematic manner, e.g., the plurality of carbon nanotubes 112 is arranged approximately along a same direction and or have two or more sections within each of which the plurality of carbon nanotubes 112 are arranged approximately along a same direction (different sections can have different directions). In one embodiment, the carbon nanotube network structure 116 includes the plurality of carbon nanotubes 112 disorderly arranged and parallel to the surface of the carbon nanotube network structure 116.

The plurality of carbon nanotubes 112 can be single-walled, double-walled, multi-walled carbon nanotubes, or their combinations. The plurality of carbon nanotubes 112 which are single-walled have a diameter of about 0.5 nanometers (nm) to about 50 nm. The plurality of carbon nanotubes 112 which are double-walled have a diameter of about 1.0 nm to about 50 nm. The plurality of carbon nanotubes 112 which are multi-walled have a diameter of about 1.5 nm to about 50 nm.

A method for making the CNT/PANI composite film 110, according to one embodiment, includes:

(S10), fabricating the plurality of carbon nanotubes 112 by chemical vapor deposition (CVD) on a silicon wafers with iron as a catalyst and acetylene as a precursor;

(S11), obtaining a uniform carbon nanotube suspension by ultrasonic oscillating the plurality of carbon nanotubes 112 in ethanol, wherein a time of ultrasonic oscillating is about 10 minutes, and a power of the ultrasonic oscillating is about 800 watts;

(S12), filtrating the carbon nanotube suspension through a microporous membrane with the aid of vacuum;

(S13), forming the carbon nanotube network structure 116 and drying the carbon nanotube network structure 116 at about 80 degrees Celsius for 12 hours in a vacuum oven, wherein the carbon nanotube network structure 116 is removed off from the microporous membrane;

(S14), immersing the carbon nanotube network structure 116 in 40 ml aqueous solution containing 0.04 mol $L^{-1}$ HCL and 0.002 mol $L^{-1}$ aniline monomers (purity 99.5%) for ten minutes of complete infiltration;

(S15), dropping 40 ml precooled aqueous solution containing 0.002 mol $L^{-1}$ ammonium persulfate, wherein the ammonium persulfate is as oxidant for polymerization;

(S16), putting mixed solution of step (S15) at 0 degrees Celsius for 24 hours to react completely resulting in the polyaniline layer 114 coated uniformly on the carbon nanotube network structure 116, to form the CNT/PANI composite film 110; and (S17), picking out the CNT/PANI composite film 110 from the reacted solution, cleaning the CNT/PANI composite film 110 with deionized water, acetone and ethanol, and drying the CNT/PANI composite film 110 at 80 degrees Celsius in the vacuum oven for 12 hours.

Figure 4:
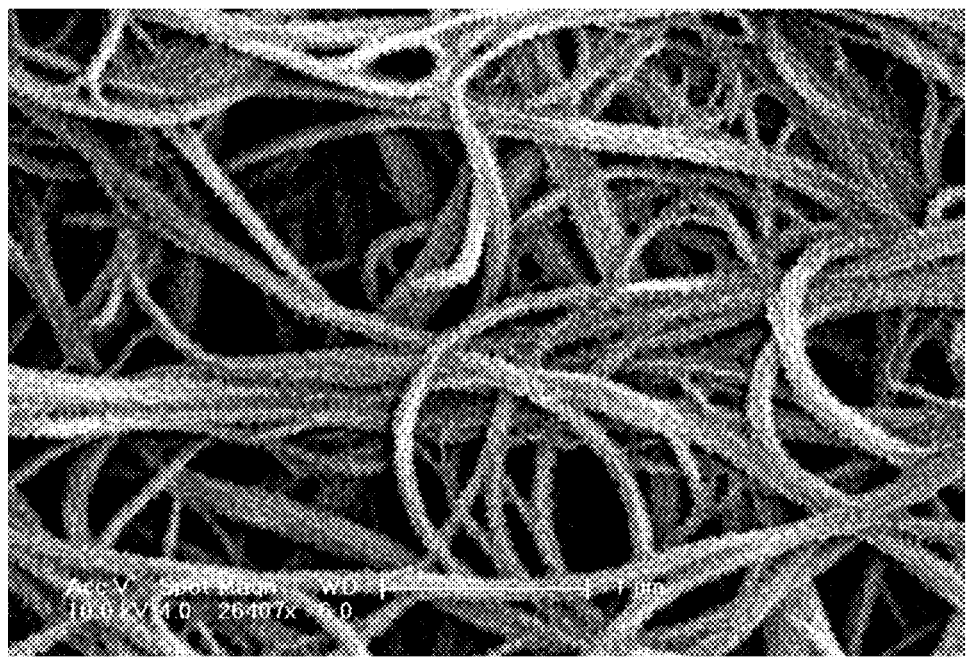
FIG. 4 shows a scanning electron microscope (SEM) image of the CNT/PANI composite film of FIG. 3.

A scanning electron microscope (SEM) image of the CNT/PANI composite film 110 is as shown in FIG. 4. The supercapacitor has certain flexibility and can be arbitrarily bended.

The first battery electrode 124 is cathode of a primary battery. The primary battery can be a $Zn/MnO_2$ primary battery, or a lithium metal battery. In one embodiment, the primary battery is a $Zn/MnO_2$ primary battery. The first battery electrode 124 is $MnO_2$. A length and width of the first battery electrode 124 is the same as the length and width of the first supercapacitor electrode 122.

The first current collector 126 is adhered to the first battery electrode 124. The first current collector 126 is made of conductor material such as Au, Ag, Cu, and/or Al. A length and width of the first current collector 126 is the same as the length and width of the first battery electrode 124. A thickness of the first current collector 126 can range from about 1 μm to about 200 μm.

A method for making the first battery electrode 124 and the first current collector 126, according to one embodiment, includes:

(S20), fabricating a cathode slurry which consists of 70% of MnO2, 10% of carbon black and 20% of poly(vinylidene fluoride) ten-fold diluted in N-methyl-2-pyrrolidone;

(S21), coating the cathode slurry on the first current collector 126 and dried completely to obtain the first battery electrode 124 on the first current collector 126;

(S22), cutting the cathode slurry and the first current collector 126 into disks in diameter of 10 mm.

The first connector 129 is contacted with the first supercapacitor electrode 122 and the first current collector 126. The first supercapacitor electrode 122 and the first current collector 126 are electrically connected via the first connector 129. The first connector 129 can be made of conductor material such as Au, Ag, Cu, Al and/or conductive adhesive. The shape of the first connector 129 is not limited. In one embodiment, the first connector 129 is an aluminum tab with a width of about 2 mm. The aluminum tab comprises a first point and a second point opposite to the first point. The first point of the aluminum tab is contacted with the first supercapacitor electrode 122, and the second point of the aluminum tab is contacted with the first current collector 126.

The second electrode 13 includes a second supercapacitor electrode 132, a second battery electrode 134, a second current collector 136, and a second connector 139. The second supercapacitor electrode 132, the second battery electrode 134, and the second current collector 136 are planar structures and the second battery electrode 134 is sandwiched between the second supercapacitor electrode 132 and the second current collector 136. The second supercapacitor electrode 132 is adjacent to the separator 14. The second supercapacitor electrode 132 and the second current collector 136 are electrically connected via the second connector 139.

The second supercapacitor electrode 132 is the same as that of the first supercapacitor electrode 122.

The second battery electrode 134 is anode of a primary battery. A length and width of the second battery electrode 134 can be the same as the length and width of the second supercapacitor electrode 132. In one embodiment, the primary battery is a $Zn/MnO_2$ primary battery. The second battery electrode 134 is made of zinc.

The second current collector 136 is adhered to the second battery electrode 134. The second current collector 136 is made of conductor material such as Au, Ag, Cu, and/or Al. A length and width of the second current collector 136 is the same as the length and width of the second battery electrode 134. A thickness of the second current collector 136 can range from about 1 μm to about 200 μm. The second current collector 136 can be selected according to need. In one embodiment, the second battery electrode 134 is made of zinc. The second current collector 136 is omitted because of the good electrical conductivity of the second battery electrode 134.

The second connector 139 is contacted with the second supercapacitor electrode 132 and the second current collector 136. The second supercapacitor electrode 132 and the second current collector 136 are electrically connected via the second connector 139. The second connector 139 can be made of conductor material such as Au, Ag, Cu, Al, and/or conductive adhesive. The shape of the second connector 139 is not limited. In one embodiment, the second connector 139 is an aluminum tab with a width of about 2 mm. The aluminum tab comprises a first point and a second point opposite to the first point. The first point of the aluminum tab is contacted with the second supercapacitor electrode 132, and the second point of the aluminum tab is contacted with the second current collector 136. The second connector 139 can be selected according to need. In one embodiment, the second battery electrode 134 is made of zinc. The second connector 139 is omitted because of the good electrical conductivity of the second battery electrode 134.

The separator 14 separates the first electrode 12 and the second electrode 13. The separator 14 prevents positive active material of the first electrode 12 and the negative active material of the second electrode 13 from directly contacting. The separator 14 can make ions in the electrolyte 15 move between the first electrode 12 and the second electrode 13. The separator 14 can be made of non-metallic material and include a plurality of pores to make the ions go through. The non-metallic material can be polypropylene, glass fiber membrane (AGM), or qualitative filter paper. In one embodiment, the separator 14 is qualitative filter paper.

The first electrode 12, the second electrode 13, and the separator 14 are located in the electrolyte 15. The electrolyte 15 can be liquid or gel and can be selected according to the first battery electrode 124 and the second battery electrode 134. In one embodiment, the first battery electrode 124 and the second battery electrode 134 are $MnO_2$ and Zn, respectively. The electrolyte 15 is 1 mol/L $H_2SO_4$ aqueous solution.

The shell 16 can be a closed structure. The first electrode 12, the second electrode 13, the separator 14, and the electrolyte 15 are packaged in the shell 16.

Figure 5:
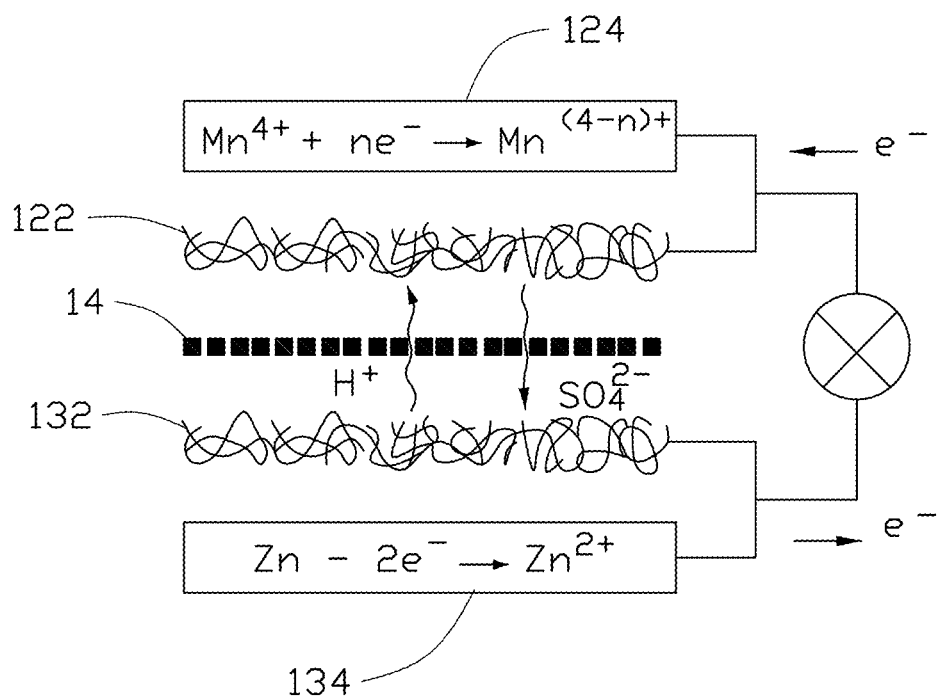
FIG. 5 shows a discharging process of the rechargeable battery of FIG. 1 according to one embodiment.

As shown in FIG. 5, during discharging process of the rechargeable battery 10, the Zn in the second battery electrode 134 is transformed to $Zn^{2+}$ ions in oxidation reactions, and the electrons are transferred from the second battery electrode 134 to the electric circuit. Meanwhile, the $Mn^{4+}$ in the first battery electrode 124 is transformed to $Mn^{(4-n)+}$ in reduction reactions, and the electrons are transferred from the electric circuit to the first battery electrode 124. There is an electric field $E_d$ in the rechargeable battery 10. The direction of the electric field $E_d$ is from the second battery electrode 134 to the first battery electrode 124. Under the Coulomb force the $H^+$ ions in the electrolyte 15 will move to the first supercapacitor electrode 122 and the $SO_4^{2-}$ ions in the electrolyte 15 will move to the second supercapacitor electrode 132. The first connector 129 can increase the electrons' transfer between the first supercapacitor electrode 122 and the first current collector 126. The second connector 139 can increase the electrons' transfer between the second supercapacitor electrode 132 and the second battery electrode 134.

Figure 6:
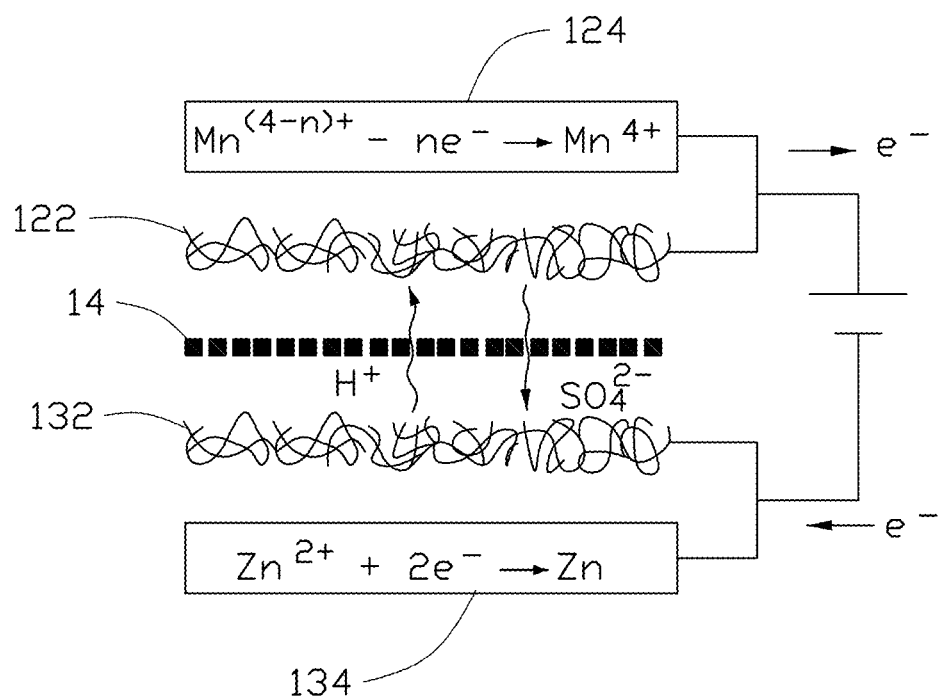
FIG. 6 shows a charging process of the rechargeable battery of FIG. 1 according to one embodiment.

As shown in FIG. 6, during charging process of the rechargeable battery 10, there is an electric field $E_c$ in the rechargeable battery 10. The direction of the electric field $E_c$ is from the first battery electrode 124 to the second battery electrode 134. Under the Coulomb force the $SO_4^{2-}$ ions in the electrolyte 15 will move to the first supercapacitor electrode 122, the $H^+$ ions and the $Zn^{2+}$ ions in the electrolyte 15 will move to the second supercapacitor electrode 132. The $Zn^{2+}$ ions in the second battery electrode 134 is transformed to Zn in reduction reactions, and the electrons are transferred from the electric circuit to the second battery electrode 134. Meanwhile, the $Mn^{(4-n)+}$ in the first battery electrode 124 is transformed to $Mn^{4+}$ in oxidation reactions, and the electrons are transferred from the first battery electrode 124 to the electric circuit.

Referring to FIGS. 7, 8, 9, and 10, the electrochemical performances of the rechargeable battery 10 with the $Zn/MnO_2$ primary battery is compared.

Figure 7:
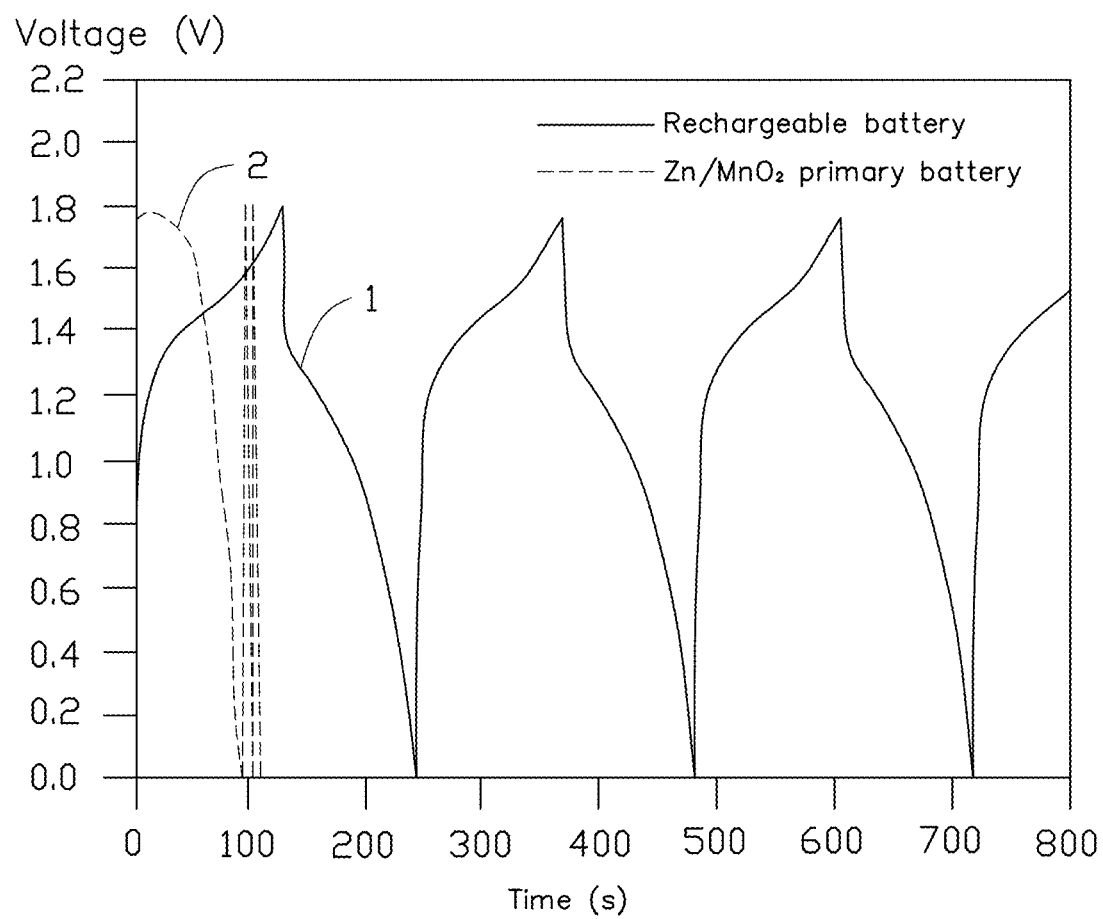
FIG. 7 shows galvanostatic charging-discharging curves of the rechargeable battery of FIG. 1 with a potential window in 0-1.8V.

As shown in FIG. 7, curve 1 indicates a galvanostatic charging-discharging curve of the rechargeable battery 10, and curve 2 indicates a galvanostatic charging-discharging curve of the $Zn/MnO_2$ primary battery. In this embodiment shown in FIG. 7, the rechargeable battery 10 can be charged and discharged with the potential window in 0-1.8V. During the first charging process the voltage of the rechargeable battery 10 increased from 0V to about 1.8V within about 120 s, and during the first discharging process the voltage of the rechargeable battery 10 decreased from about 1.8V to about 0V within about 100 s. Then comes the next charging and discharging process. As a contrast, the $Zn/MnO_2$ primary battery is discharged from initial voltage at about 1.8 V to 0V, and then the $Zn/MnO_2$ primary battery cannot be recharged again.

Figure 8:
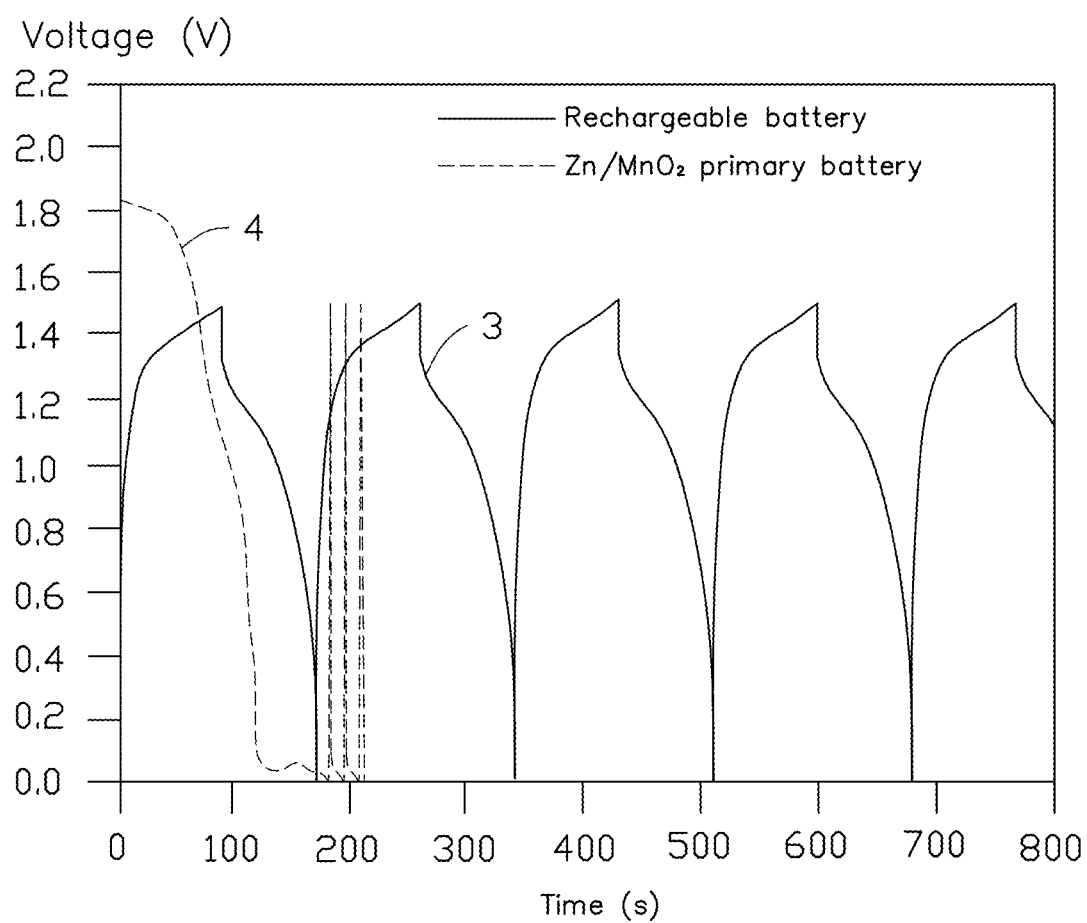
FIG. 8 shows galvanostatic charging-discharging curves of the rechargeable battery of FIG. 1 with a potential window in 0-1.5V.
Figure 9:
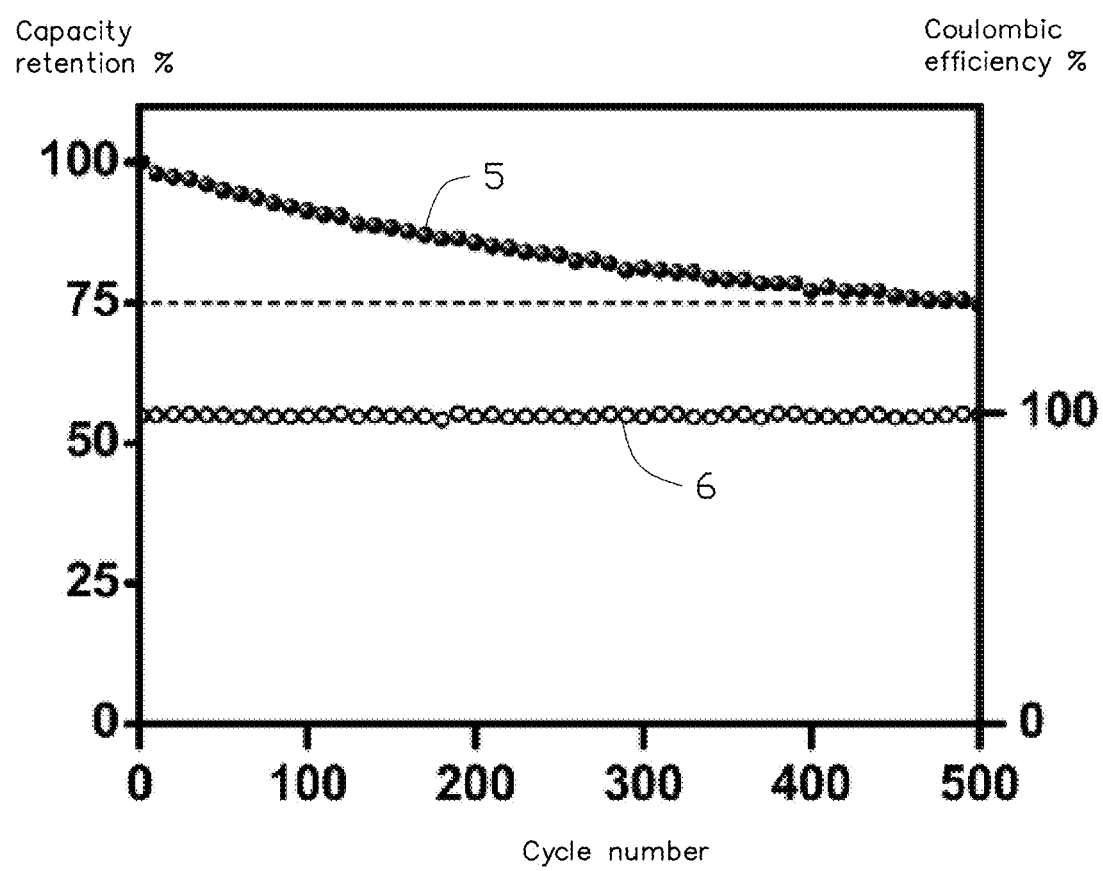
FIG. 9 shows coulombic efficiency changing of the rechargeable battery of FIG. 1 with a potential window in 0-1.5V.

As shown in FIG. 8, curve 3 indicates a galvanostatic charging-discharging curve of the rechargeable battery 10, and curve 4 indicates a galvanostatic charging-discharging curve of the $Zn/MnO_2$ primary battery. In this embodiment shown in FIG. 8, the rechargeable battery 10 can be charged and discharged with the potential window in 0-1.5V. As a contrast, the $Zn/MnO_2$ primary battery is discharged from initial voltage and then cannot be recharged again. FIG. 9 illustrates the capacity changing (curve 5) and the coulombic efficiency changing (curve 6) of the rechargeable battery 10 shown in FIG. 8. The coulombic efficiency is closer to 100 percent with the cycles increasing to 500. The first connector 129 provides an electron transfer route between the first supercapacitor electrode 122 and the first current collector 126. Similarly, the second connector 139 provides an electron transfer route between the second supercapacitor electrode 132 and the second current collector 136. The first connector 129 and the second connector 139 could increase the cycle performance of the rechargeable battery 10.

Figure 10:
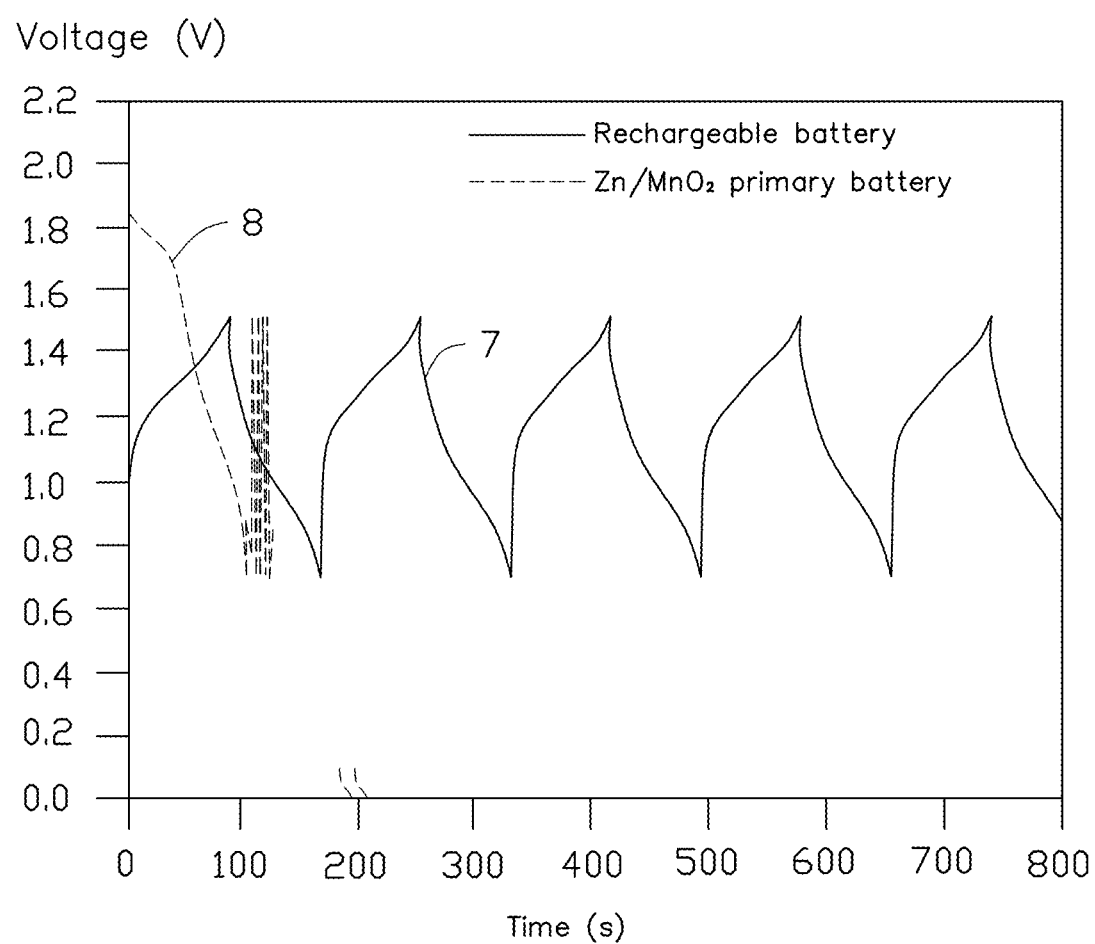
FIG. 10 shows galvanostatic charging-discharging curves of the rechargeable battery of FIG. 1 with a potential window in 0.7-1.5V.

As shown in FIG. 10, curve 7 indicates a galvanostatic charging-discharging curve of the rechargeable battery 10, and curve 8 indicates a galvanostatic charging-discharging curve of the $Zn/MnO_2$ primary battery. In this embodiment shown in FIG. 10, the rechargeable battery 10 can be charged and discharged with the potential window in 0.7-1.5V.

In summary, the rechargeable battery 10 combining supercapacitor electrodes and connections with a primary battery. There is a synergistic reaction between the supercapacitor electrodes and the battery electrode which made the rechargeable battery 10 can be charged and disrecharged up to 500 times. Furthermore, the rechargeable battery 10 has certain flexibility and can be arbitrarily bended or twisted and can be used in wearable electronic equipments.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A rechargeable battery, comprising: a first electrode, a second electrode, a separator, and electrolyte, wherein the first electrode, the second electrode, and the separator are planar structures, and the separator is sandwiched between the first electrode and the second electrode;

the first electrode comprising a first supercapacitor electrode, a first battery electrode, a first current collector, and a first connector, wherein the first supercapacitor electrode, the first battery electrode, and the first current collector are planar structures, the first battery electrode is sandwiched between the first supercapacitor electrode and the first current collector, the first supercapacitor electrode comprises a first surface and a second surface opposite to the first surface, and the second surface is adjacent to and parallel with the first battery electrode; the first current collector comprises a third surface and a fourth surface opposite to the third surface, and the third surface is adjacent to and parallel with the first battery electrode; the first supercapacitor electrode is adjacent to the separator, and the first supercapacitor electrode and the first current collector are electrically connected via the first connector, the first connector is in direct contact with at least one part of the first surface that is parallel with the first battery electrode; and the second electrode comprising a second supercapacitor electrode, and a second battery electrode, wherein the second supercapacitor electrode and the first battery electrode are planar structures, and the second supercapacitor electrode is adjacent to the separator.

2. The rechargeable battery as claimed in claim 1, wherein the first connector is aluminum tab, the aluminum tab comprises a first point and a second point opposite to the first point, the first point of the aluminum tab is contacted with the first supercapacitor electrode, and the second point of the aluminum tab is contacted with the first current collector.

3. The rechargeable battery as claimed in claim 1, wherein the first connector is made of conductive adhesive.

4. The rechargeable battery as claimed in claim 1, wherein the first battery electrode is made of $MnO_2$, carbon black and poly(vinylidene fluoride).

5. The rechargeable battery as claimed in claim 4, wherein a weight ratio of the $MnO_2$, carbon black and poly(vinylidene fluoride) is about 7:1:2.

6. The rechargeable battery as claimed in claim 1, wherein the second electrode comprises a second current collector, the second current collector is planar structure, the second battery electrode is sandwiched between the second supercapacitor electrode and the second current collector.

7. The rechargeable battery as claimed in claim 1, wherein the second electrode comprises a second connector, the second supercapacitor electrode and the second current collector are electrically connected via the second connector.

8. The rechargeable battery as claimed in claim 7, wherein the second connector is aluminum tab, the aluminum tab comprises a first point and a second point opposite to the first point, the first point of the aluminum tab is contacted with the second supercapacitor electrode, and the second point of the aluminum tab is contacted with the second current collector.

9. The rechargeable battery as claimed in claim 7, wherein the second connector is made of conductive adhesive.

10. The rechargeable battery as claimed in claim 1, wherein the first supercapacitor electrode and the second supercapacitor electrode comprise a carbon nanotube/polyaniline composite film.

11. The rechargeable battery as claimed in claim 10, wherein the carbon nanotube/polyaniline composite film having a plurality of micropores comprises a carbon nanotube network structure and a polyaniline layer coating the carbon nanotube network structure.

12. The rechargeable battery as claimed in claim 11, wherein the carbon nanotube network structure comprises a plurality of carbon nanotubes disorderly arranged and parallel to a surface of the carbon nanotube network structure.

13. The rechargeable battery as claimed in claim 12, wherein the plurality of micropores is defined by adjacent carbon nanotubes of the carbon nanotube network structure.

14. The rechargeable battery as claimed in claim 1, wherein the first connector is in direct contact with at least one part of the fourth surface that is parallel with the first battery electrode.

15. The rechargeable battery as claimed in claim 1, wherein the fourth surface is in direct contact with the electrolyte.

16. The rechargeable battery as claimed in claim 1, wherein the first connector is a substantially n-shaped connector, and comprises a first portion, a second portion, and a third portion connected in series; the first portion is in direct contact with at least one part of the first surface, the third portion is in direct contact with at least one part of the fourth surface.

17. The rechargeable battery as claimed in claim 1, wherein at least one part of the first supercapacitor electrode is sandwiched between the first battery electrode and the first connector.

\* \* \* \* \*